United States Patent
Espax et al.

(10) Patent No.: US 6,714,514 B1
(45) Date of Patent: Mar. 30, 2004

(54) METHOD AND APPARATUS FOR IMPROVING CAPACITY IN A RADIO COMMUNICATIONS SYSTEM

(75) Inventors: Francesc Boixadera Espax, Chatenay-Malabry (FR); Yann Farmine, Vaux sur Seine (FR); Nicholas Whinnett, Paris (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/333,369

(22) Filed: Jun. 15, 1999

(51) Int. Cl.$^7$ ............................................. H04L 12/56
(52) U.S. Cl. ...................................................... 370/230
(58) Field of Search ................................ 370/229, 230, 370/231, 232, 233, 234, 235, 236, 236.1

(56) References Cited

U.S. PATENT DOCUMENTS

| | | | | |
|---|---|---|---|---|
| 5,224,120 A | * | 6/1993 | Schilling | 375/130 |
| 5,442,625 A | * | 8/1995 | Gitlin et al. | 370/342 |
| 5,457,687 A | * | 10/1995 | Newman | 370/232 |
| 5,471,647 A |   | 11/1995 | Gerlach et al. | 455/63 |
| 5,490,136 A | * | 2/1996 | Sereno et al. | 370/342 |
| 5,619,492 A | * | 4/1997 | Press et al. | 370/441 |
| 5,633,859 A | * | 5/1997 | Jain et al. | 370/234 |
| 5,722,043 A | * | 2/1998 | Rappaport et al. | 455/452 |
| 5,729,531 A | * | 3/1998 | Raith et al. | 370/252 |
| 5,729,534 A | * | 3/1998 | Jokinen et al. | 370/280 |
| 5,777,984 A | * | 7/1998 | Gun et al. | 370/230 |
| 5,878,029 A | * | 3/1999 | Hasegawa et al. | 370/236 |
| 5,909,443 A | * | 6/1999 | Fichou et al. | 370/236 |
| 5,940,375 A | * | 8/1999 | Soumiya et al. | 370/235 |
| 6,044,270 A | * | 3/2000 | Raith | 455/434 |
| 6,266,330 B1 | * | 7/2001 | Jokinen et al. | 370/329 |

FOREIGN PATENT DOCUMENTS

| | | |
|---|---|---|
| EP | 0807989 A1 | 9/1997 |
| WO | WO95/07578 | 3/1995 |
| WO | WO98/03030 | 1/1998 |

OTHER PUBLICATIONS

"Forward Link Antenna Diversity Using Feedback for Indoor Communication System" Jen–Wei Liang and Arogyaswami J. Paulraj, Information Systems Laboratory, Stanford University, IEEE, May 9, 1995, pp. 1753–1755.

EPO Search Report for Application No. 98 40 1461 Examiner O. Dejonghe, Oct. 9, 1998; 4 pages.

* cited by examiner

Primary Examiner—Wellington Chin
Assistant Examiner—William Schultz
(74) Attorney, Agent, or Firm—Kenneth A. Haas

(57) ABSTRACT

A method of improving capacity in a duplexing scheme is provided. The duplexing scheme has a first band of frequencies and a second band of frequencies. The method comprises the steps of: determining an amount of available capacity on the first band of frequencies (steps 402, 404, 410), transmitting, on the first band of frequencies, a variable amount of feedback data corresponding to the amount of available capacity on the first band of frequencies, the feedback data comprising data for improving the quality of communications on the second band of frequencies, and optimizing (steps 406, 408, 412, 414) transmissions on the second band of frequencies using, when available, the feedback data.

13 Claims, 6 Drawing Sheets

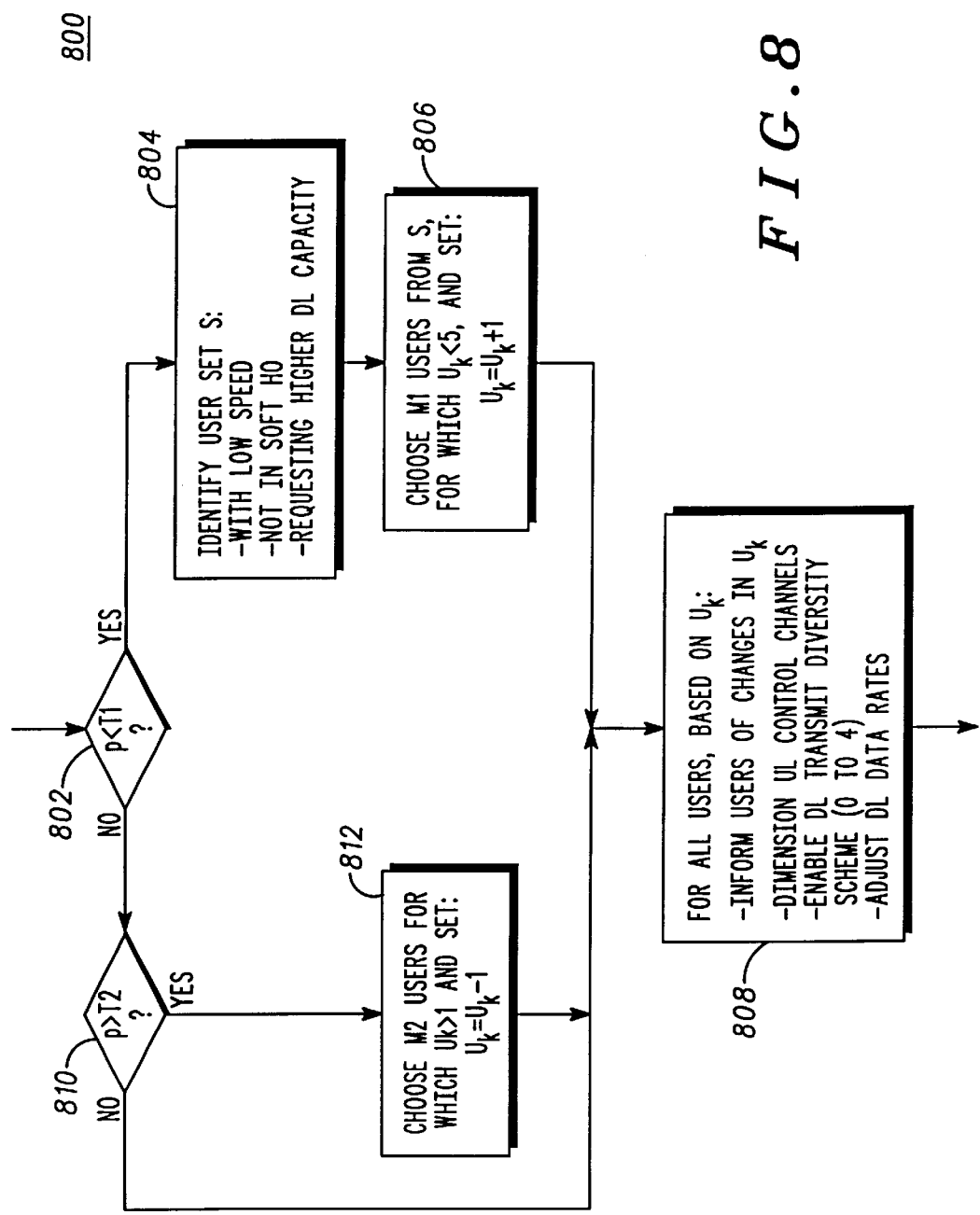

METHOD AND APPARATUS FOR IMPROVING CAPACITY IN A RADIO COMMUNICATIONS SYSTEM

FIELD OF THE INVENTION

The present invention relates to radio communication systems, in particular systems employing a Frequency Division Duplex (FDD) scheme of frequency allocation, for example, a Global System for Mobile Communication (GSM) or a Universal Mobile Telecommunications System (UMTS).

BACKGROUND OF THE INVENTION

In an FDD scheme, an first frequency band is allocated for uplink communications and a second frequency band is allocated for downlink communications between, for example, a mobile terminal and a fixed terminal, such as a base station.

A Code Division Multiple Access (CDMA) system operating in the FDD scheme, such as Wideband-CDMA, as has been proposed for UMTS has a limited capacity. The capacity is limited by interference. Therefore, as the system loading (the number of subscribers using the system) increases, the level of interference in the system increases, thereby limiting the capacity of the system.

It is therefore desirable to increase the capacity of a telecommunications system, such as a Wideband-CDMA system, operating under the FDD scheme in order to accommodate an increase in the demand for loading the telecommunications system.

SUMMARY OF THE INVENTION

According to a first aspect of the present invention, there is provided a method of improving capacity in a duplexing scheme, the duplexing scheme having a first band of frequencies and a second band of frequencies, the method comprising the steps of: determining an amount of available capacity on the first band of frequencies, transmitting, on the first band of frequencies, a variable amount of feedback data corresponding to the amount of available capacity on the first band of frequencies, the feedback data comprising data for improving the quality of communications on the second band of frequencies, and optimising transmissions on the second band of frequencies using, when available, the feedback data.

According to a second aspect of the present invention, there is provided an apparatus for improving capacity in a duplexing scheme, the duplexing scheme having a first band of frequencies and a second band of frequencies, comprising: means for determining an amount of available capacity on the first band of frequencies, means for transmitting, on the first band of frequencies, a variable amount of feedback data corresponding to the amount of available capacity on the first band of frequencies, the feedback data comprising data for improving the quality of communications on the second band of frequencies, and means for optimising transmissions on the second band of frequencies using, when available, the feedback data.

According to a third aspect of the present invention, there is provided a method of optimising transmit diversity in an antenna array, the antenna array comprising a plurality of antennas, the method comprising: selecting a predetermined number of antennas from the plurality of antennas, and setting the phase of each of the predetermined number of antennas in response to feedback data received from a terminal arranged to receive transmissions from the antenna array.

Other, preferred, features and advantages are set forth in and will become apparent from the accompanying description and dependent claims 2 to 11 and 14.

By using spare capacity available on the uplink band of frequencies to transmit feedback data, it is possible to optimise downlink communications to reduce interference in the downlink band of frequencies, thereby increasing downlink capacity.

Such a technique is particularly useful in situations of asymmetric system loading, for example, where the loading on the downlink is greater than on the uplink. Such loading may occur in locations where slow moving subscribers exist, such as in microcells and picocells.

At least one example of the present invention will now be described, by way of example, with reference to the accompanying drawings, in which:

BRIEF DESCRIPTION OF THE DRAWINGS

FIG. 8 is a flow diagram of another functional block of FIG. 6.

DESCRIPTION OF A PREFERRED EMBODIMENT

Figure 1:
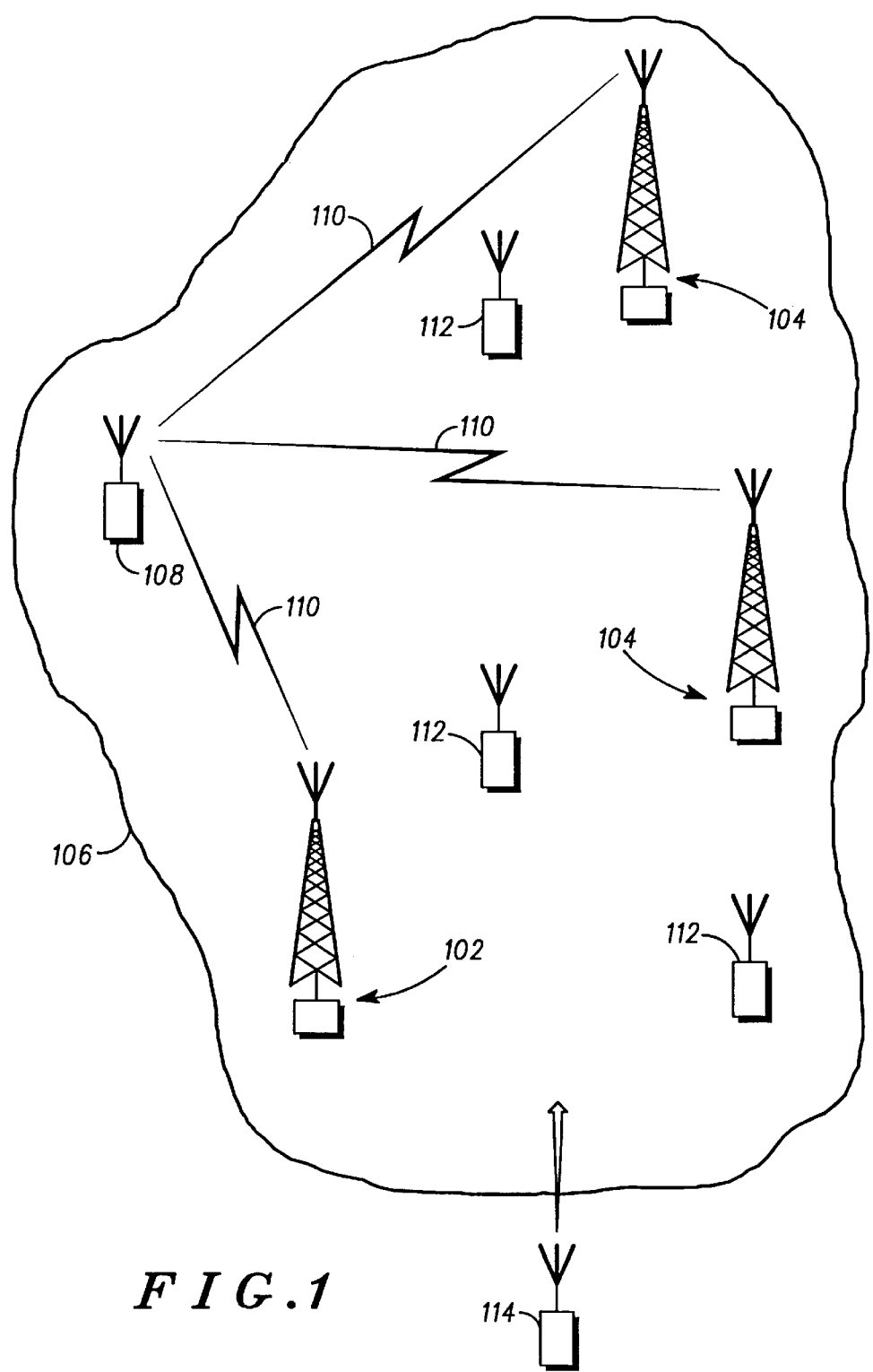
FIG. 1 is a schematic illustration of a communications system.

A Wideband-CDMA system 100 (FIG. 1) comprises a base station 102 and a plurality of other base stations 104 providing a coverage area 106. The base station 102 is capable of communicating with a mobile terminal 108 via a radio-frequency interface 110. Other mobile terminals 112 can be present in the coverage area 106.

Figure 2:
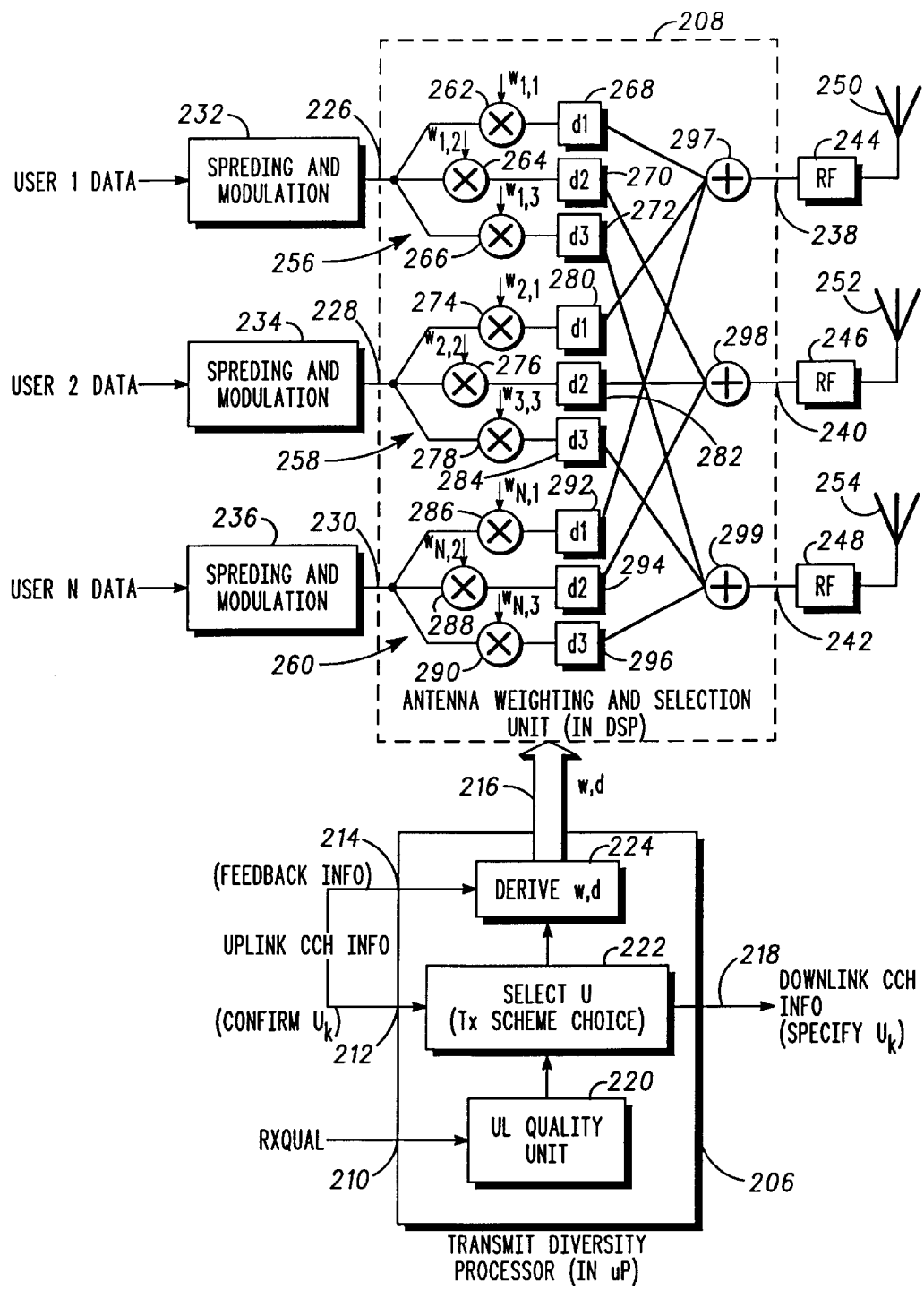
FIG. 2 is a schematic illustration of a base station constituting an embodiment of the invention.

The base station 102 (FIG. 2) comprises a transmit diversity processor 206 and an antenna weighting and selection unit 208. The functionality of the transmit diversity processor 206 and an antenna weighting and selection unit 208 are both embodied by a microprocessor (not shown) of the base station 102.

The transmit diversity processor 206 has a first input 210 to receive a signal indicative of the quality of signals received at the base station 200, a second input 212 to receive a confirmation of an optimisation scheme to be employed (described in more detail hereinafter), and a third input 214 to receive feedback data. The transmit diversity processor 206 also has a first output 216 for transmitting weight and delay (w, d) data to the antenna weighting and selection unit 208 and a second output 218 for transmitting downlink control channel information to the mobile terminal 108 and the other mobile terminals 112.

The transmit diversity processor 206 comprises an uplink quality unit 220 coupled to the first input 210 and a scheme selection unit 222, the scheme selection unit 222 being coupled to the second input 212 and the second output 218. The scheme selection unit 222 is coupled to a derivation unit 224. The derivation unit 224 is coupled to the third input 214 and the first output 216. The derivation unit 224 derives the weights and delays (w, d) from the feedback data received at the third input 214.

The feedback data includes data relating to the performance of the signals transmitted, in particular, on the downlink, and/or data which the mobile terminal 108 uses to instruct the base station 102 as to the weights and delays to apply within the antenna weighting and selection unit 208.

The antenna weighting and selection unit 208 has a fourth input 226 coupled to a first spreading and modulation unit 232, the first spreading and modulation unit 232 being capable of spreading and modulating data to be transmitted to a first user. The antenna weighting and selection unit 208 has a fifth input 228 and an $N^{th}$ input 230, each respectively coupled to a second and an $N^{th}$ spreading and modulation unit 234, 236. Similarly, the second and third spreading and modulation units 234, 236 spread and modulate data from a second user and an $N^{th}$ user, respectively.

The antenna weighting and selection unit 208 also has a third output 238, a fourth output 240 and a fifth output 242. The third output 238, fourth output 240 and fifth output 242 are respectively coupled to a first Radio Frequency (RF) unit 244, a second RF unit 246 and a third RF unit 248. The first, second and third RF units 244, 246, 248 convert input signals into radio-frequency signals according to any method known in the art. The first, second and third RF units 244, 246, 248 are respectively coupled to a first antenna 250, a second antenna 252 and a third antenna 254. The first second and third antenna 250, 252, 254 form an antenna array.

The antenna weighting and selection unit 208 comprises a first weighting and delay network 256, a second weighting and delay network 258, and a third weighting and delay network 260.

The first weighting and delay network 256 comprises a first mixing unit 262, a second mixing unit 264 and a third mixing unit 266, each of which are coupled to the fourth input 226. The first, second and third mixing units 262, 264, 266 are respectively coupled to a first delay unit 268, a second delay unit 270, and a third delay unit 272. The first, second and third mixing units 262, 264, 266 have a respective first weight input $w_{1,1}$, a second weight input $w_{1,2}$, and a third weight input $w_{1,3}$ for applying weight data for the first, second and third antennas 250, 252, 254 relating to the data of the first user.

The second weighting and delay network 258 comprises a first mixing unit 274, a second mixing unit 276 and a third mixing unit 278, each of which are coupled to the fifth input 228. The first, second and third mixing units 274, 276, 278 are respectively coupled to a first delay unit 280, a second delay unit 282, and a third delay unit 284. The first, second and third mixing units 274, 276, 278 have a respective first weight input $w_{2,1}$, a second weight input $w_{2,2}$, and a third weight input $w_{2,3}$ for applying weight data for the first, second and third antennas 250, 252, 254 relating to the data of the second user.

The third weighting and delay network 260 comprises a first mixing unit 286, a second mixing unit 288 and a third mixing unit 290, each of which are coupled to the sixth input 230. The first, second and third mixing units 286, 288, 290 are respectively coupled to a first delay unit 292, a second delay unit 294, and a third delay unit 296. The first, second and third mixing units 286, 288, 290 have a respective first weight input $w_{N,1}$, a second weight input $w_{N,2}$, and a third weight input $w_{N,3}$ for applying weight data for the first, second and third antennas 250, 252, 254 relating to the data of the $N^{th}$ user.

The first delay units 268, 280, 292 are coupled to a first summation unit 297 in order to sum all weighted and delayed signals intended for the first antenna 250, the first summation unit 297 being coupled to the third output 238.

The second delay units 270, 282, 294 are coupled to a second summation unit 298 in order to sum all weighted and delayed signals intended for the second antenna 252, the second summation unit 298 being coupled to the fourth output 240.

The third delay units 272, 284, 296 are coupled to an $N^{th}$ summation unit 299 in order to sum all weighted and delayed signals intended for the third antenna 254, the $N^{th}$ summation unit 299 being coupled to the fifth output 242.

Figure 3:
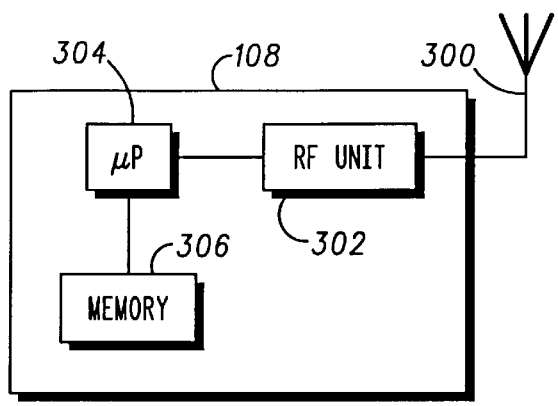
FIG. 3 is a schematic illustration of a terminal constituting an embodiment of the invention.

The mobile terminal 108 (FIG. 3) comprises an antenna 300 coupled to an RF unit 302. The RF unit 302 carries out all the radio-frequency related tasks known in the art, for example modulation and frequency conversion. The RF unit 302 is coupled to a microprocessor 304, the microprocessor 304 being coupled to a memory 306. The functionality of the invention can be incorporated into the microprocessor 304.

Operation of the above apparatus will now be described.

The base station 102 communicates with the mobile terminal 108 over a frequency range. The frequency range is divided into a first, uplink, band of frequencies $f_{UL}$ and a second, downlink, band of frequencies $f_{DL}$ in accordance with an FDD scheme known in the art. Hence, the uplink band of frequencies $f_{UL}$ are used for uplink transmissions from the mobile terminal 108 to the base station 102, whilst the downlink band of frequencies $f_{DL}$ are used for downlink transmissions from the base station 102 to the mobile terminal 108.

A first, second, third, fourth and fifth optimisation scheme $S_1$, $S_2$, $S_3$, $S_4$, $S_5$ is stored in a memory (not shown) in the base station 100. The first, second, third, fourth and fifth optimisation schemes $S_1$, $S_2$, $S_3$, $S_4$, $S_5$ each have a respective first, second, third, fourth and fifth capacity values associated therewith. The first, second, third, fourth and fifth capacity values relate to the amount of capacity required by the first, second, third, fourth and fifth optimisation schemes $S_1$, $S_2$, $S_3$, $S_4$, $S_5$ in order to transmit feedback data to the base station 102 on the uplink band of frequencies $f_{UL}$. The amount of capacity required by each of the first, second, third, fourth and fifth optimisation schemes $S_1$, $S_2$, $S_3$, $S_4$, $S_5$ varies on a incremental basis, the first optimisation scheme $S_1$ requiring the least capacity, whilst the fifth optimisation scheme $S_5$ requiring the most capacity on the uplink band of frequencies, i.e. capacity $(S_1)$<capacity$(S_2)$< . . . <capacity $(S_5)$. This is not an essential requirement.

Examples of the optimisation scheme are as follows:

The first optimisation scheme, $S_1$, can be delay based. In such an optimisation scheme, each of the first, second and third antennas 250, 252, 254 transmit at the same power. However, the CDMA code is provided with a time offset.

In the second optimisation scheme, $S_2$, of the first, second and third antennas 250, 252, 254, a single antenna is selected which corresponds to the best total power received at the mobile terminal 108.

In the third optimisation scheme, $S_3$, two of the best performing antennas from the first, second and third antennas 250, 252, 254 are selected, i.e. the two antennas responsible for the best total power received at the mobile terminal 108. The phase of the two best performing antennas is adjusted to reduce the error rate on the downlink band of frequencies $f_{DL}$.

The fourth optimisation scheme, $S_4$, is similar to the third optimisation scheme $S_3$. However, both the gain and the phase of the two best performing antennas are adjusted to reduce the error rate on the downlink band of frequencies $f_{DL}$.

The fifth optimisation scheme comprises adjusting the gain and phase of all the antennas in the antenna array in order to maximise output.

Although the above optimisation schemes have been described in relation to the first, second, and third antennas 250, 252, 254, the optimisation schemes are not limited to an array of three antennas and the antenna array can comprise greater number of antennas. Similarly, more than two best performing antennas can be selected for the above described optimisation schemes. The best performing antennas can be identified by, for example, using unique training bits to identify each antenna.

An lower threshold $T_1$ is predetermined and is an error rate which corresponds to a maximum amount of capacity available on the uplink band of frequencies $f_{UL}$ at a given time. A upper threshold $T_2$ is predetermined and is an error rate which corresponds to a minimum amount of capacity available on the uplink band of frequencies $f_{UL}$ at a given time.

Figure 4:
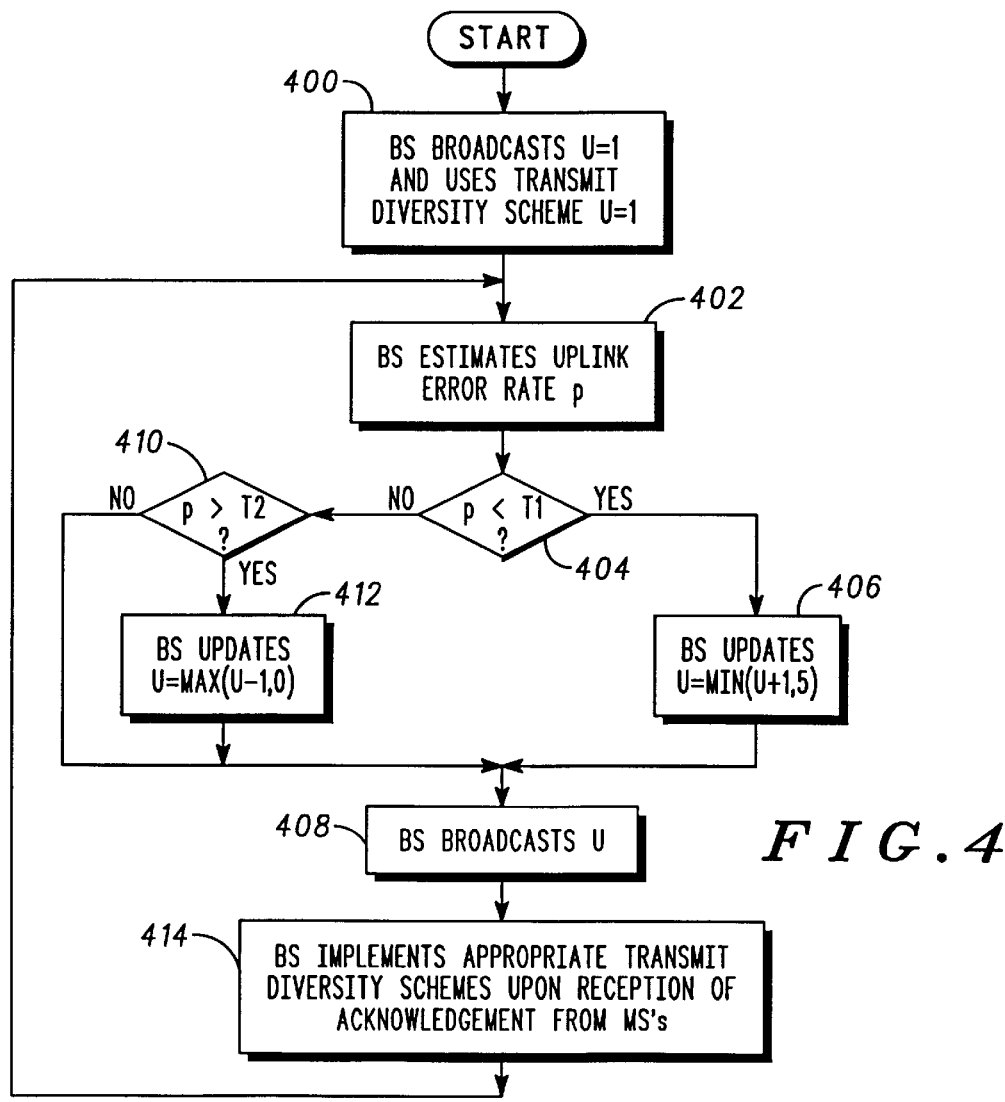
FIG. 4 is a flow diagram illustrating operation of the apparatus of FIG. 2.

Referring to FIG. 4, when the base station 102 is initialised, the selection unit 222 sets a variable U to value "1", indicating that the first optimisation scheme is to be employed initially. The value of the variable U is broadcast (step 400) to the mobile terminal 108 so that the mobile terminal 108 knows which optimisation scheme to implement. If the other mobile terminals 112 intend communicating with the base station 102, they will also receive the variable U.

The uplink quality unit 220 estimates (step 402) the error rate p of communications on the uplink band of frequencies $f_{UL}$ by means of any technique known in the art, for example bit error rate, word error rate or frame error rate methods. The error rate p is a quality measure which corresponds to the capacity available on the uplink band of frequencies $f_{UL}$.

The uplink quality unit 220 determines (step 404) whether the error rate p is below the threshold $T_1$. If the error rate p is below the threshold $T_1$, the uplink quality unit 220 increments (step 406) the variable U by 1, provided the value of the variable U does not exceed the maximum number of optimisation schemes, in this case, five. The base station 102 then broadcasts (step 408) the updated value of the variable U to the mobile terminal 108, and the other mobile terminals 112.

If the error rate p is not below the threshold $T_1$, the uplink quality unit 220 determines (step 410) whether the error rate p is above the lower threshold $T_2$. If the error rate p is above the threshold $T_2$, the uplink quality unit 220 decrements (step 412) the value of the variable U by 1, provided it does not fall below the minimum number of optimisation schemes. The base station 108 then broadcasts (step 408) the updated value of the variable U. If the error rate p is not above the threshold $T_2$, the base station 108 broadcasts (step 408) the current, unaltered, value of the variable U.

The base station 102 then implements (step 414) the optimisation scheme selected in the following manner. The base station 102 awaits reception of an acknowledgement from the mobile terminal 108 that the value of the variable U has been received, if the value of the variable U has been changed. The selection unit 222 then selects one of the first, second, third, fourth or fifth optimisation scheme according to the value of the variable U. The derivation unit 224, based upon the optimisation scheme $S_1$, $S_2$, $S_3$, $S_4$, $S_5$ selected by the selection unit 222, derives weight and delay values to be used by the first, second and $N^{th}$ weight and delay networks 256, 258, 260. The weight and delay values derived are transferred to the first, second and $N^{th}$ weight and delay network, 256, 258, 260 for implementation.

The uplink quality unit 220 then repeats the above procedure so that the capacity of the uplink band of frequencies $f_{UL}$ is frequently monitored.

Figure 5:
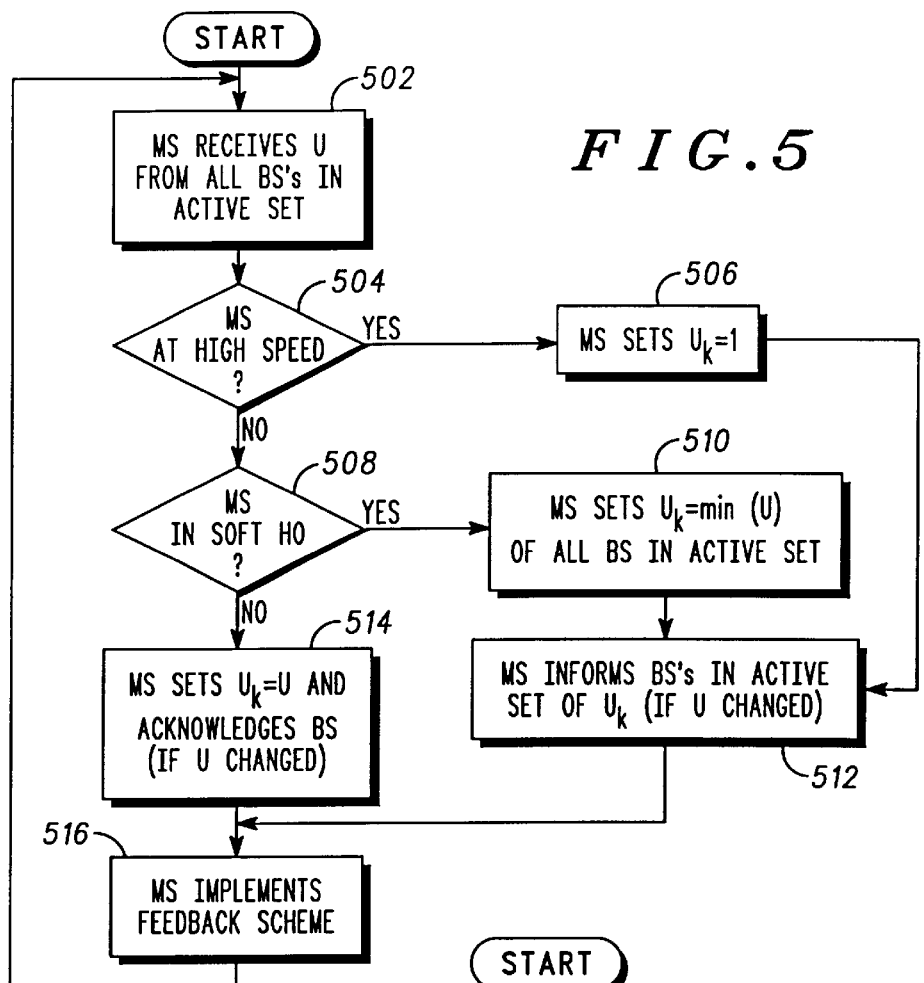
FIG. 5 is a flow diagram illustrating interaction of the terminal with the apparatus of FIG. 2.

Referring to FIG. 5, the mobile terminal 108 receives (step 502) the value of the variable U which has been broadcast (step 508) by the base station 102. Corresponding values of variables equivalent to the variable U can also be received from the other base stations 104 in an active set.

Upon receipt of the value of the value of the variable U, the speed of the mobile terminal 102 is determined according to any technique known in the art. The mobile terminal 108 then determines (step 504) whether the mobile terminal 108 is travelling at high speed, for example 50 kph. If the mobile terminal is travelling at high speed, the mobile terminal 108 selects (step 506) the first optimisation scheme $S_1$, i.e. the optimisation scheme requiring the least capacity on the uplink band of frequencies $f_{UL}$, by setting a variable $U_k$ to the same value as the variable U, where k identifies the mobile terminal 108.

The mobile terminal 108 then informs (step 512) the base station 102 (including the other base stations 112 in the active set) of the value of the variable $U_k$, if the value of the variable $U_k$ set by the mobile terminal 108 differs from the value of the variable U received from the base station 102. The mobile terminal 108 then implements (step 516) the optimisation scheme corresponding to the value of the variable U.

Although reference is made to the value of the variable U received from the base station 102, the actions described above apply equally in relation to the other base stations 112 in the active set.

In CDMA systems, a soft handover mode is possible. Therefore, if the mobile terminal 108 determines (step 504) that the mobile terminal 108 is not travelling at high speed, the mobile terminal 108 determines (step 508) whether the soft handover mode is enabled. If the soft handover mode is enabled, the mobile terminal 108 examines the value of the variable U and the corresponding values of the variable U received from the other base stations 112 in the active set and sets the value of the variable $U_k$ to the lowest of the values received. The mobile terminal 108 then informs (step 512) the base station 100 (including the other base stations 112 in the active set) of the value of the variable U, if the value of the variable U set by the mobile terminal 108 differs from the value of the variable U received from the base station 102. The mobile terminal 108 then implements (step 516) the optimisation scheme corresponding to the value of the variable $U_k$.

If the mobile terminal 108 determines (step 508) that the soft handover mode is not enabled and if the value of the variable $U_k$ differs from the value of the variable U received from the base station 102, the mobile terminal 108 sets (step 514) the value of the variable $U_k$ to the value of the variable U received from the base station 102 and transmits to the base station 102 an acknowledgement. The mobile terminal 108 then implements (step 516) the optimisation scheme corresponding to the value of the variable $U_k$.

Once the optimisation scheme corresponding to the value of the variable U has been implemented (step 516), the mobile terminal 108 awaits receipt (step 502) of an updated value of the variable U.

Figure 6:
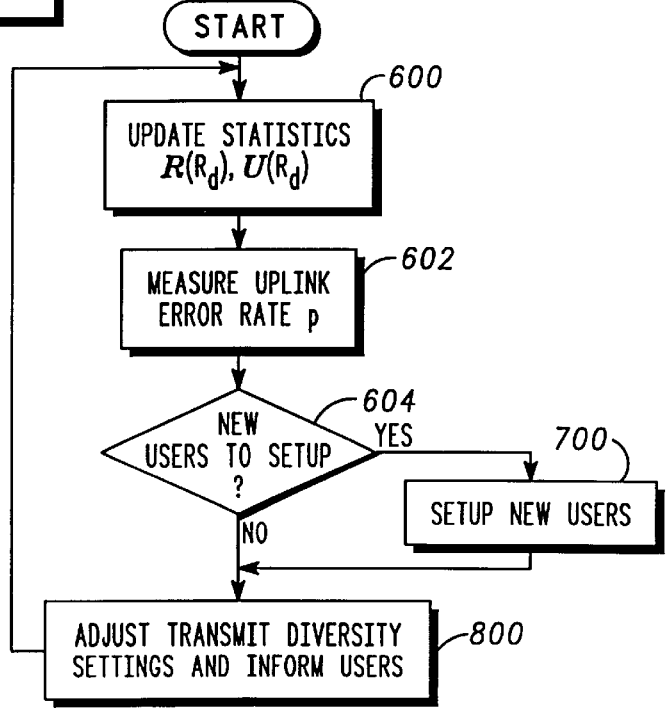
FIG. 6 is a flow diagram illustrating operation of the base station constituting another embodiment of the invention.

In a second embodiment of the invention, a new mobile terminal 114 can enter the coverage area 106 and can need to communicate with the base station 102 (FIG. 6). Periodically, the base station 102 generates and updates (step 600) statistics relating to the average assigned bit rate on the downlink band of frequencies $f_{DL}$ for each mobile terminal in communication with the base station 102 as a function of the bit rate (requested by the mobile terminal 108 or the network in which the system 100 operates) and the most common of the first, second, third, fourth and fifth optimisation schemes $S_1$, $S_2$, $S_3$, $S_4$, $S_5$ assigned to mobile terminal 108 and the other mobile terminals 112 in communication with the base station 102 for a given requested bit rate.

The uplink error rate p is measured (step 602) by the uplink quality unit 220. The base station 102 then determines (step 604) whether there are any new mobile terminal 114 which need to communicate with the base station 102. If the new mobile terminal 114 needs to register, the base station 102 executes (step 700) the new user set up procedure described hereinafter. If the new mobile terminal 114 does not need to be set up, the base station 102 executes (step 800) an adjustment procedure described below.

Figure 7:
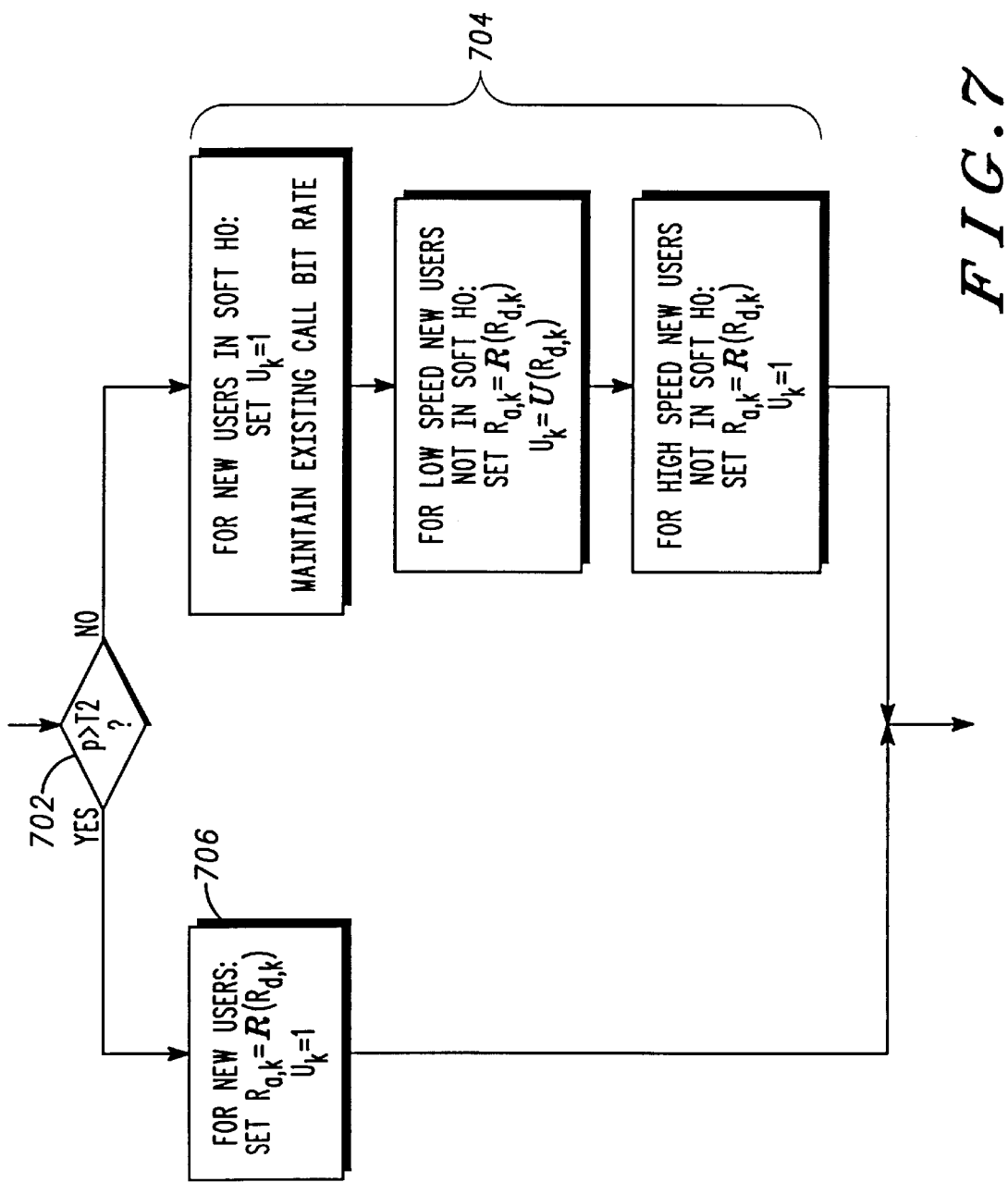
FIG. 7 is a flow diagram of a functional block of FIG. 6.

Referring to FIG. 7, the execution (step 700) of the new user set up procedure entails the following steps. The uplink quality unit 220 determines (step 702) whether the error rate p is greater than the upper threshold $T_2$. If the error rate p is not greater than the upper threshold $T_2$, the selection unit 222 sets (step 704) the value of the variable $U_k$, indicating the optimisation scheme to be employed by the new mobile terminal 114, and the assigned bit rate for the new mobile terminal 114.

In the event that the soft handover mode is enabled, the selection unit 222 assigns the value of the variable $U_k$ corresponding to the new mobile terminal 114, to "1"; this indicates that the new mobile terminal 114 will use the first optimisation scheme $S_1$ requiring the least capacity on the uplink band of frequencies $f_{UL}$. If the new mobile terminal 114 is moving at a low speed and the soft handover mode is not enabled, a bit rate on the downlink band of frequencies $f_{DL}$ is assigned to the new mobile terminal 114 according to the statistics generated in order to ensure that the bit rate assigned to the new mobile terminal 114 is comparable with mobile terminals having similar bit rate demands and the new mobile terminal 114 is assigned the same optimisation scheme as is being used by the mobile terminal 108 and the other mobile terminals 112. If the new mobile terminal 114 is travelling at high speed and the soft handover mode is not enabled, a bit rate is assigned to the new mobile terminal 114 in the same way as for the low speed mobile terminals described above, and the variable $U_k$ of the new mobile terminal 114 is assigned the value "1" corresponding to the first optimisation scheme $S_1$ which requires the least capacity on the uplink band of frequencies $f_{UL}$.

If the value of the error rate p is greater than the upper threshold $T_2$, the base station 102 assigns (step 706) the value of the variable $U_k$ corresponding to the new mobile terminal to "1", indicating that the new mobile terminal 114 will use the first optimisation scheme $S_1$ requiring the least capacity on the uplink band of frequencies $f_{UL}$ and a bit rate is assigned to the new mobile terminal 114 in the same way as for the low speed mobile terminals described above.

Referring to FIG. 8, the execution (step 800) of the adjustment procedure is as follows.

The base station 102 determines (step 802) whether the error rate p is less than the upper threshold $T_1$. If the error rate p is less than the upper threshold $T_1$, the base station 102 identifies (step 804) a user set. The user set comprises all mobile terminals registered with the base station 102 which are travelling at low speed, do not have soft handover mode enabled and which are requesting a higher capacity on the downlink band of frequencies $f_{DL}$. The base station then selects (step 806) $M_1$ mobile terminals from the user set which are using either the first, second, third or fourth optimisation schemes $S_1$, $S_2$, $S_3$, $S_4$. The base station 102 then assigns the next highest optimisation scheme, i.e. the optimisation scheme requiring the next highest amount of capacity on the uplink band of frequencies $f_{UL}$, for example the fifth optimisation scheme $S_5$, to the $M_1$ selected mobile terminals.

For all of the mobile terminals registered with the base station 102, the base station 102 communicates (step 808) the changes to the values of the variable $U_k$ of the corresponding mobile terminals. Additionally, the base station 102 adjusts the capacity of the control channels of the uplink band of frequencies $f_{UL}$, enables the optimisation schemes assigned to the selected mobile terminals and adjusts the data rates on the downlink band of frequencies $f_{DL}$.

If the error rate p is not less than the upper threshold $T_1$, the base station 102 determines (step 810) whether the error rate p is greater than the lower threshold $T_2$. If the error rate p is greater than the lower threshold $T_2$, the base station 102 selects (step 812) $M_2$ mobile terminals which are employing an optimisation scheme other that the first optimisation scheme $S_1$. The base station 102 reduces that value of the variable $U_k$ for the $M_2$ mobile terminals by one so that the selected mobile terminals are assigned the next lowest optimisation scheme. This procedure occurs when there is insufficient capacity on the uplink band of frequencies $f_{UL}$.

For all of the mobile terminals registered with the base station 102, the base station 102 communicates (step 808) the changes to the altered values of the variable $U_k$. Additionally, the base station 102 adjusts the capacity of the control channels of the uplink band of frequencies $f_{UL}$, enables the optimisation schemes assigned to the selected mobile terminals and adjusts the data rates on the downlink band of frequencies $f_{DL}$. This step (step 808) is also executed in the event that the error rate p is not greater than the lower threshold $T_2$.

From the above described examples, it can be seen that use of capacity on the uplink band of frequencies $f_{UL}$ can be used send feedback data to improve, and therefore increase capacity of, communications on the downlink band of frequencies $f_{DL}$.

Although the above examples have been described in the context of using capacity available on the uplink band of frequencies $f_{UL}$ in order to accommodate an increase in the demand on the downlink band of frequencies $f_{DL}$, a converse arrangement is possible, i.e. using capacity available on the downlink band of frequencies $f_{DL}$ in order to accommodate an increase in the demand on the uplink band of frequencies $f_{UL}$.

We claim:

1. A method of duplex communication over a wireless link between first and second terminals, comprising:

transmitting from said first terminal to said second terminal over a first band of frequencies and transmitting from said second terminal to said first terminal over a second band of frequencies, transmitting feedback data from said first terminal to said second terminal in said first band of frequencies, said feedback data relating to the quality of communications received by said first terminal from said second terminal, and the transmission of said feedback data utilising a variable amount of the capacity of said first band of frequencies, determining an amount of available capacity in said first band of frequencies, using an amount of the capacity of said first band of frequencies for the transmission of said feedback data that is a function of the amount of capacity determined as being available in said first band of frequencies, and using said feedback data, if any, to improve transmissions from said second terminal to said first terminal in said second band of frequencies, the quality of communications from said second terminal to said first terminal being improved for a greater amount of the capacity of said first band of frequencies used by the transmission of said feedback data.

2. A method as claimed in claim 1, further comprising selecting an initial optimization scheme for improving the quality of communications from said second terminal to said first terminal, said initial optimization scheme having an associated initial amount of feedback data utilizing a corresponding amount of the capacity of said first band of frequencies, the selection of the initial optimization scheme being a function of the amount of capacity available in the first band of frequencies.

3. A method as claimed in claim 2, wherein said initial optimization scheme is selected from a set of at least two optimization schemes having respective amounts of feedback data.

4. A method as claimed in claim 3, wherein said initial amount of feedback data associated with said initial optimization scheme is the smallest amount of feedback data corresponding to the optimization schemes of said set, thereby using the smallest amount of capacity of the first band of frequencies.

5. A method as claimed in claim 4, wherein a second optimization scheme is subsequently selected to replace said initial optimization scheme, wherein the capacity consumed in the first band of frequencies by said second optimization scheme is greater than the capacity consumed by said initial optimization scheme.

6. A method as claimed in claim 5, wherein the second optimization scheme is a single increment away from the first optimization scheme.

7. A method as claimed in claim 1, wherein the amount of available capacity in the first band of frequencies is estimated by monitoring error rates.

8. A method as claimed in claim 2, wherein said first terminal is a mobile terminal and said second terminal is a first fixed terminal, said first terminal being simultaneously in communication with said first fixed terminal and said second fixed terminal over said first and second bands of frequencies, the first and second fixed terminals communicating with the terminal on a respective channel in the first band of frequencies, wherein the amount of capacity available is determined for each of the respective channels and the channel having the least amount of available capacity is selected as the basis for selecting said initial optimization scheme.

9. A method as claimed in claim 2, wherein said initial optimization scheme is selected taking account of the speed of movement of said first terminal.

10. A method as claimed in claim 1, wherein when the amount of available capacity in the first band of frequencies is insufficient to permit transmission of the feedback data, the selected first optimisation scheme does not require the transmission of any feedback data.

11. A method as claimed in claim 2, wherein upon registration of a new subscriber, the optimization scheme selected for the new subscriber has a comparable amount of feedback data associated therewith to existing subscribers in the same cell.

12. Apparatus for improving capacity in a method of communication as claimed in claim 1, said apparatus comprising said first terminal, and said first terminal including:

means for transmitting from said first terminal to said second terminal over a first band of frequencies and receiving from said second terminal over a second band of frequencies, including means for transmitting feedback data from said first terminal to said second terminal in said first band of frequencies, said feedback data relating to the quality of communications received by said first terminal from said second terminal, the transmission of said feedback data utilising a variable amount of the capacity of said first band of frequencies, and the amount of the capacity of said first band of frequencies used by the transmission of said feedback data being arranged to be a function of the amount of capacity determined as being available in said first band of frequencies.

13. An apparatus for improving capacity in a method of communication as claimed in claim 1, said apparatus comprising said second terminal, and said second terminal including:

means for receiving from said first terminal over a first band of frequencies and for transmitting to said first terminal over a second b and of frequencies, including means for receiving feedback data from said first terminal in said first band of frequencies, said feedback data relating to the quality of communications received by said first terminal from said second terminal, and the transmission of said feedback data utilising a variable amount of the capacity of said first band of frequencies, means for determining an amount of available capacity in said first band of frequencies, the amount of the capacity of said first band of frequencies used by said feedback data being arranged to be a function of the amount of capacity determined as being available in said first band of frequencies, and means for using said feedback data, if any, to improve transmissions from said second terminal to said first terminal in said second band of frequencies, the quality of communications from said second terminal to said first terminal being improved for a greater amount of the capacity of said first band of frequencies used by said feedback data.

* * * * *